US012316012B2

(12) United States Patent
Mondi et al.

(10) Patent No.: US 12,316,012 B2

(45) Date of Patent: May 27, 2025

(54) BASE STATION ANTENNAS HAVING CALIBRATION CIRCUIT CONNECTIONS THAT PROVIDE IMPROVED IN-COLUMN AND/OR ADJACENT CROSS-COLUMN ISOLATION

(71) Applicant: Outdoor Wireless Networks LLC, Claremont, NC (US)

(72) Inventors: Nagaraju Mondi, Jagtial (IN); Rakesh Kalwani, Margao (IN); Sekharbabu Bunga, Sullurpeta (IN); Kumara Swamy Kasani, GodavariKahani (IN); Ligang Wu, Suzhou (CN)

(73) Assignee: Outdoor Wireless Networks LLC, Richardson, TX (US)

(*) Notice: Subject to any disclaimer, the term of this patent is extended or adjusted under 35 U.S.C. 154(b) by 188 days.

(21) Appl. No.: 18/116,923

(22) Filed: Mar. 3, 2023

(65) Prior Publication Data

US 2023/0291121 A1 Sep. 14, 2023

(30) Foreign Application Priority Data

Mar. 7, 2022 (CN) ......................... 202210214078.8

(51) Int. Cl.

| | |
|---|---|
| ***H01Q 21/24*** | (2006.01) |
| ***H01Q 1/24*** | (2006.01) |
| ***H01Q 3/26*** | (2006.01) |
| ***H01Q 5/28*** | (2015.01) |
| ***H01Q 5/48*** | (2015.01) |

(52) U.S. Cl.

CPC ............. *H01Q 21/24* (2013.01); *H01Q 1/246* (2013.01); *H01Q 3/2617* (2013.01); *H01Q 5/28* (2015.01); *H01Q 5/48* (2015.01)

(58) Field of Classification Search

CPC ...... H01Q 21/24; H01Q 1/246; H01Q 3/2617; H01Q 5/38; H01Q 5/48; H01Q 3/267; H01Q 5/28

See application file for complete search history.

(56) References Cited

U.S. PATENT DOCUMENTS

| | | | | |
|---|---|---|---|---|
| 2004/0032365 | A1* | 2/2004 | Gottl ...................... | H01Q 3/267 342/368 |
| 2007/0205955 | A1* | 9/2007 | Korisch ................. | H01Q 21/24 343/797 |
| 2021/0391929 | A1* | 12/2021 | Xiao .................. | H01Q 21/0006 |

* cited by examiner

*Primary Examiner* — Dimary S Lopez Cruz
*Assistant Examiner* — Anna N Hamadyk
(74) *Attorney, Agent, or Firm* — Myers Bigel, P.A.

(57) ABSTRACT

A base station antenna includes a calibration circuit that has a plurality of pairs of directional couplers and an antenna array that includes a plurality of columns of radiating elements. The first polarization radiators of the radiating elements in each column are electrically connected to a first directional coupler of a respective one of the pairs, and the second polarization radiators of the radiating elements in the column are electrically connected to a second directional coupler of the respective one of the pairs. The directional couplers may be arranged in a manner that reduces in-column coupling and/or that reduces cross-column coupling between adjacent columns of radiating elements.

20 Claims, 10 Drawing Sheets

BASE STATION ANTENNAS HAVING CALIBRATION CIRCUIT CONNECTIONS THAT PROVIDE IMPROVED IN-COLUMN AND/OR ADJACENT CROSS-COLUMN ISOLATION

CROSS-REFERENCE TO RELATED APPLICATION

The present application claims priority under 35 U.S.C. § 119 to Chinese Patent Application No. 202210214078.8, filed Mar. 7, 2022, the entire content of which is incorporated herein by reference as if set forth in its entirety.

FIELD

The present invention relates to cellular communications systems and, more particularly, to cellular communications systems that employ beamforming antennas

BACKGROUND

Cellular communications systems are used to provide wireless communications to fixed and mobile subscribers. In a typical cellular communications system, a geographic area is divided into a series of regions that are referred to as "cells," and each cell is served by a base station Each base station may include baseband equipment, radios and base station antennas that are configured to provide two-way radio frequency ("RF") communications with subscribers that are within the cell.

Base station antennas are directional devices that can concentrate the RF energy that is transmitted or received in certain directions. The "gain" of a base station antenna in a given direction is a measure of the ability of the antenna to concentrate the RF energy in that direction. The radiation pattern that is generated by a base station antenna, which is also referred to as an "antenna beam," is compilation of the gain of the antenna across all different directions. Base station antennas are typically designed to generate antenna beams that are shaped to provide service a pre-defined coverage area such as the cell or a portion thereof that is typically referred to as a "sector." The antenna beams generated by a base station antenna are typically designed to have minimum gain levels throughout the pre-defined coverage area, and to have much lower gain levels outside of the coverage area to reduce interference with adjacent cells or sectors. Typically, a base station antenna includes one or more phase-controlled arrays of radiating elements, with the radiating elements arranged in one or more vertical columns when the antenna is mounted for use, where "vertical" refers to a direction that is generally perpendicular relative to the plane defined by the horizon.

FIG. 1 is a schematic diagram of a conventional cellular base station 10. The base station 10 includes several base station antennas 20 that are mounted on a raised structure 30 such as an antenna tower. Baseband equipment 40 may be mounted at the base of the tower 30 and cabling connections 42 may connect the baseband equipment 40 to remote radio heads (not visible in FIG. 1) that are mounted behind each base station antenna 20. Each base station antenna 20 may generate an antenna beam 50 (shown schematically in FIG. 1) that provides service to a 120° sector in the horizontal or "azimuth" plane. For example, each base station antenna 20 may be designed to have a half power beamwidth of about 65° which provides good coverage throughout the 120° sector.

The antenna beams generated by early base station antennas were typically fixed in both shape and boresight pointing direction (the boresight pointing direction refers to the direction where the antenna beam exhibits peak gain), meaning that once a base station antenna was installed, its antenna beams could not be changed unless a technician physically reconfigured and/or repositioned the antenna. The shape and boresight pointing direction of the antenna beams generated by most modern base station antennas can be changed electronically by transmitting control signals to the antenna that alter the amplitude and/or phase of the RF energy that is transmitted/received through each radiating element of the array that generates the antenna beam. The most common change to the antenna beam is changing the elevation or "down tilt" angle (i.e., the angle relative to the horizon of the boresight pointing direction of the antenna beam). Base station antennas that can have their down tilt angle changed electronically are typically referred to as remote electronic tilt ("RET") antennas.

In order to increase capacity, some cellular base stations now employ beamforming radios and beamforming antennas that include antenna arrays that have multiple columns of dual-polarized radiating elements. In some beamforming antennas, each column of radiating elements is coupled to a respective pair of ports of a beamforming radio (one radio port for each polarization). The beamforming radio may adjust the amplitudes and phases of the sub-components of RF signals that are passed to each column of radiating elements so that the RF energy radiated by each column of radiating elements constructively combines in desired directions to form more focused, higher gain antenna beams that have a narrowed beamwidth in the azimuth plane. In many cases, beamforming antennas can generate different antenna beams on a time-slot by time-slot basis so that very high gain antenna beams can be electronically steered throughout a sector during different time-slots to provide coverage to the subscribers throughout the sector.

Unfortunately, the relative amplitude and phases applied by the radio to the sub-components of an RF signal that are passed to each column of a beamforming antenna may change in undesired ways as the sub-components of the RF signal are passed from the radio to the base station antenna. Variations in the relative amplitudes and phases may arise, for example, because of non-linearities in the amplifiers that are used to amplify the respective transmitted and received signals, differences in the lengths of the cabling connections between the different radio ports and respective RF ports on the antenna, variations in temperature and the like. If the relative amplitudes and phases change, then the resulting antenna beam will typically exhibit lower gain in desired directions and higher gain in undesired directions, resulting in degraded performance. While some of the causes for the amplitude and phase variations may tend to be static (i.e., they do not change over time), others may be dynamic, and hence more difficult to compensate.

In order to reduce the impact of the above-discussed amplitude and phase variations, beamforming antennas may include a calibration circuit that samples each sub-component of an RF signal and passes these samples back to the radio. The calibration circuit may comprise a plurality of directional couplers, each of which is configured to tap RF energy from a respective one of the RF transmission paths that extend between the radio ports and the respective columns of radiating elements, as well as a calibration combiner that is used to combine the RF energy that is tapped from of each of these RF transmission paths. The output of the calibration combiner is coupled to a calibration port on the antenna, which in turn is coupled back to the radio. The radio may use the samples of each sub-component of the RF signal to determine the relative amplitude and/or phase variations along each transmission path, and may then adjust the applied amplitude and phase weights to account for these variations.

SUMMARY

Pursuant to some embodiments of the present invention, base station antennas are provided that include a calibration circuit having a plurality of pairs of directional couplers and an antenna array that includes a plurality of columns of radiating elements, where first polarization radiators of the radiating elements in each column are electrically connected to a first directional coupler of a respective one of the pairs of directional couplers, and second polarization radiators of the radiating elements in the column are electrically connected to a second directional coupler of the respective one of the pairs of directional couplers. A first directional coupler in a first of the pairs of directional couplers is only adjacent directional couplers in pairs of directional couplers other than the first of the pairs of directional couplers.

In some embodiments, the first directional coupler in the first of the pairs of directional couplers may be interposed between the two directional couplers that form a second of the pairs of directional couplers. In some embodiments, at least two directional couplers of pairs of directional couplers other than the second pair of directional couplers may be interposed between the two directional couplers that form the second of the pairs of directional couplers. In some embodiments, each directional coupler in each of the pairs of directional couplers may only be adjacent directional couplers that are in other of the pairs of directional couplers.

In some embodiments, for each of the pairs of directional couplers, at least one of the directional couplers in another one of the pairs of directional couplers may be interposed between the two directional couplers in the pair of directional couplers. In other embodiments, for each of the pairs of directional couplers, at least two of the directional couplers from one or more of the other pairs of directional couplers may be interposed between the two directional couplers in the pair of directional couplers. In still other embodiments, for each of the pairs of directional couplers, at least three of the directional couplers from one or more of the other pairs of directional couplers may be interposed between the two directional couplers in the pair of directional couplers.

In some embodiments, a first directional coupler in each of the pairs of directional couplers may be on a first side of a first axis and a second directional coupler in each of the pairs of directional couplers may be on a second side of the first axis.

In some embodiments, the first directional coupler in the first of the pairs of directional couplers may be electrically connected to a first of the columns of radiating elements and is only adjacent directional couplers that are in pairs of directional couplers that are electrically connected to columns of radiating elements that are not adjacent the first of the columns of radiating elements. In some embodiments, the directional couplers in the pairs of directional couplers may be positioned so that no set of two adjacent directional couplers are electrically connected to adjacent columns of radiating elements.

In some embodiments, the base station antenna may further comprise a plurality of first polarization RF ports and a plurality of second polarization RF ports, where each first polarization RF port is coupled to a first directional coupler in a respective one of the pairs of directional couplers, and each second polarization RF port is coupled to a second directional coupler in the respective one of the pairs of directional couplers.

In some embodiments, the directional couplers in the pairs of directional couplers may be aligned in a single row. In other embodiments, a first half of the directional couplers in the pairs of directional couplers may be aligned in a first row, and a second half of the directional couplers in the pairs of directional couplers are aligned in a second row.

Pursuant to further embodiments of the present invention, base station antennas are provided that include a calibration circuit having a plurality of pairs of directional couplers and an antenna array that includes a plurality of columns of radiating elements, where first polarization radiators of the radiating elements in each column are electrically connected to a first directional coupler of a respective one of the pairs of directional couplers, and second polarization radiators of the radiating elements in the column are electrically connected to a second directional coupler of the respective one of the pairs of directional couplers. A first directional coupler in a first of the pairs of directional couplers is interposed between the two directional couplers that form a second of the pairs of directional couplers.

In some embodiments, at least two directional couplers of pairs of directional couplers other than the second pair of directional couplers may be interposed between the two directional couplers that form the second of the pairs of directional couplers. In some embodiments, for each of the pairs of directional couplers, at least one of the directional couplers in another one of the pairs of directional couplers may be interposed between the two directional couplers in the pair of directional couplers. In some embodiments, for each of the pairs of directional couplers, at least two of the directional couplers from one or more of the other pairs of directional couplers may be interposed between the two directional couplers in the pair of directional couplers.

In some embodiments, for each of the pairs of directional couplers, at least three of the directional couplers from one or more of the other pairs of directional couplers may be interposed between the two directional couplers in the pair of directional couplers. In some embodiments, the first directional coupler in the first of the pairs of directional couplers is electrically connected to a first of the columns of radiating elements and is only adjacent directional couplers that are in pairs of directional couplers that are electrically connected to columns of radiating elements that are not adjacent the first of the columns of radiating elements. In some embodiments, the directional couplers in the pairs of directional couplers are positioned so that no set of two adjacent directional couplers are electrically connected to adjacent columns of radiating elements.

Pursuant to further embodiments of the present invention, base station antennas are provided that include a calibration circuit having a plurality of directional couplers, the plurality of directional couplers including a plurality of first polarization directional couplers and a plurality of second polarization directional couplers and an antenna array that includes a plurality of columns of radiating elements, where the radiating elements in each column are electrically connected to both a respective one of the first polarization directional couplers and a respective one of the second polarization directional couplers. A first of the first polarization directional couplers that is electrically connected to a first of the columns of radiating elements is not adjacent a first of the second polarization directional couplers that is electrically connected to the first of the columns of radiating elements.

In some embodiments, each first polarization directional coupler that is electrically connected to each of the columns of radiating elements is not adjacent the respective second polarization directional coupler that is electrically connected to each of the columns of radiating elements. In some embodiments, at least two of the directional couplers that are electrically connected to columns of radiating elements other than the first column of radiating elements are positioned between the first polarization directional coupler that is electrically connected to the first of the columns of radiating elements and the second polarization directional coupler that is electrically connected to the first of the columns of radiating elements.

In some embodiments, for each of the columns of radiating elements, at least two of the directional couplers that are electrically connected to other columns of radiating elements are positioned between the first polarization directional coupler for the column of radiating elements and the second polarization directional coupler for the column of radiating elements.

Pursuant to other embodiments of the present invention, base station antennas are provided that include a calibration circuit having a plurality of directional couplers and an antenna array that includes a plurality of columns of radiating elements, where first polarization radiators of the radiating elements in each column are electrically connected to a first directional coupler of a respective one of the pairs of directional couplers, and second polarization radiators of the radiating elements in the column are electrically connected to a second directional coupler of the respective one of the pairs of directional couplers. The directional couplers in the pairs of directional couplers are positioned so that no set of two adjacent directional couplers are electrically connected to adjacent columns of radiating elements.

In some embodiments, a first directional coupler in a first of the pairs of directional couplers is only adjacent directional couplers in pairs of directional couplers other than the first of the pairs of directional couplers. In some embodiments, each directional coupler in each of the pairs of directional couplers is only adjacent directional couplers that are in other of the pairs of directional couplers.

In some embodiments, a first directional coupler in the first of the pairs of directional couplers is interposed between first and second directional couplers that form a second of the pairs of directional couplers. In some embodiments, for each of the pairs of directional couplers, at least one of the directional couplers in another one of the pairs of directional couplers is interposed between the two directional couplers in the pair of directional couplers.

Pursuant to still further embodiments of the present invention, base station antennas are provided that include a reflector, an antenna array that includes a plurality of columns of radiating elements mounted to extend forwardly from the reflector, a calibration circuit board mounted behind the reflector, the calibration circuit board including a calibration circuit formed therein that includes a plurality of pairs of directional couplers, a plurality of first polarization RF transmission lines, each first polarization RF transmission line connecting a first of the directional couplers of each pair of directional couplers to first polarization radiators of the radiating elements in the respective columns of radiating elements, and a plurality of second polarization RF transmission lines, each second polarization RF transmission line connecting a second of the directional couplers of each pair of directional couplers to second polarization radiators of the radiating elements in the respective columns of radiating elements. A first of the first polarization RF transmission lines crosses at least one of the second polarization RF transmission lines.

In some embodiments, each first polarization RF transmission line comprises a first polarization RF transmission line segment implemented in the calibration circuit board and a first polarization RF cable, and each second polarization RF transmission line comprises a second polarization RF transmission line segment implemented in the calibration circuit board and a second polarization RF cable. In some embodiments, the first polarization RF cable of the first of the first polarization RF transmission lines crosses the second polarization RF cable of a first of the second polarization RF transmission lines. In some embodiments, the first polarization RF cable of the first of the first polarization RF transmission lines crosses at least two of the other first polarization RF cables and at least two of the second polarization RF cables.

In some embodiments, at least three of the first polarization RF transmission lines each cross at least one of the second polarization RF transmission lines. In some embodiments, the first of the first polarization RF transmission lines crosses at least three of the second polarization RF transmission lines. In some embodiments, the first of the first polarization RF transmission lines also crosses at least one of the other first polarization RF transmission lines. In some embodiments, a first of the second polarization RF transmission lines that is electrically connected to the same column of radiating elements as the first of the first polarization RF transmission lines does not cross any of the other first polarization RF transmission lines or any of the second polarization RF transmission lines. In some embodiments, the first of the first polarization RF transmission lines crosses at least two of the other first polarization RF transmission lines and at least two of the second polarization RF transmission lines.

DETAILED DESCRIPTION

Figure 1:
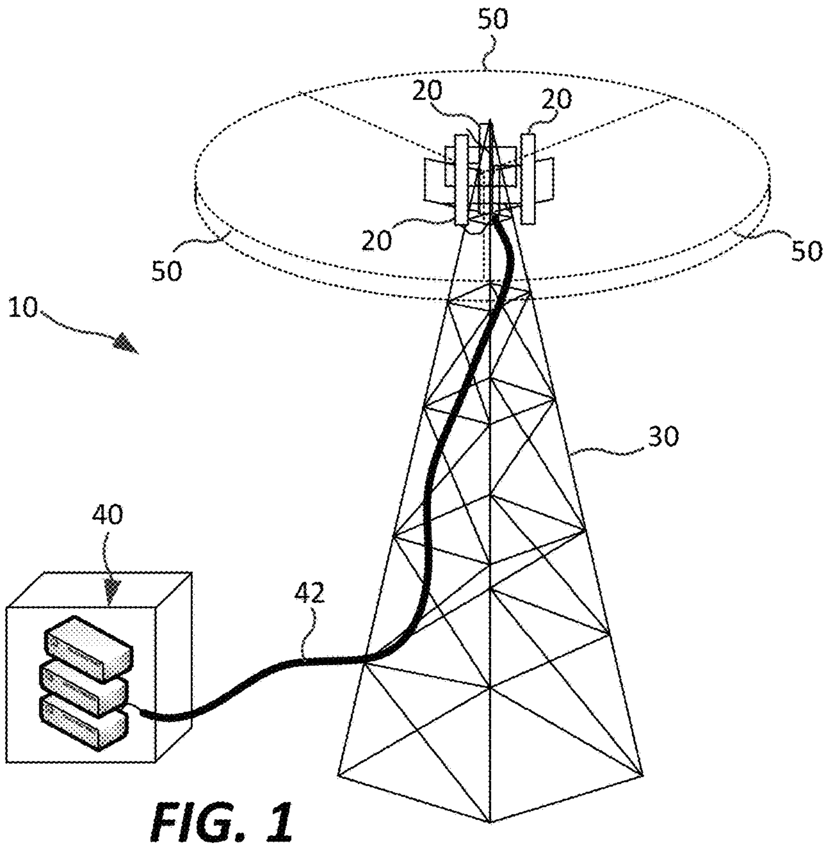
FIG. 1 (Prior Art)
FIG. 1 is a schematic diagram illustrating a conventional cellular base station.

The demand for cellular communications capacity has been increasing at a fast pace. In order to support this increased demand, base station antennas now routinely include anywhere from four to eight (or more) arrays of radiating elements, and at least some of these arrays may be multi-column beamforming antenna arrays. Moreover, the widths and lengths of base station antennas often must be kept within strict limits due to wind loading concerns, local zoning ordinances, and/or customer requirements. As such, it is often necessary to very closely space the columns of radiating elements in the beamforming arrays. Unfortunately, as the columns of radiating elements are brought closer together, increased coupling between radiating elements occurs, which can degrade performance. Thus, cellular operators often specify minimum port-to-port isolation levels for beamforming arrays. The specified port-to-port isolation levels may include in-column isolation levels, which refers to the isolation between the two RF ports (which have different polarizations) that are connected to the same column of radiating elements, cross-column co-polarization isolation, which refers to the isolation between two RF ports that are connected to different columns of radiating elements, where the two RF ports have the same polarization, and cross-column cross-polarization isolation, which refers to the isolation between two RF ports that are connected to different columns of radiating elements, where the two RF ports have different polarizations. Note that port-to-port isolation levels may also be viewed as column-to-column (or in-column) isolation levels as each RF port is coupled to a specific column of radiating elements.

In practice, the columns or radiating elements of many beamforming arrays are spaced very closely together and hence it may be difficult to meet the above-discussed isolation requirements for all of the different combinations of RF ports. For example, a four column beamforming antenna array will need to meet four in-column isolation requirements (one for each column), six cross-column co-polarization isolation requirements, and six cross-column cross-polarization isolation requirements. When a new antenna design does not satisfy all of these requirements, passive parasitic elements are typically mounted adjacent selected of the radiating elements in the antenna array to increase isolation. However, increasing cross-column isolation often acts to decrease in-column isolation, and hence it may be time consuming and difficult to "tune" an antenna array to meet all of these isolation requirements. Moreover, the resulting antenna design often includes a large number of parasitic elements, which increase the cost and manufacturing complexity.

Pursuant to embodiments of the present invention, beamforming base station antennas are provided that have calibration circuits that exhibit increased in-column and adjacent column isolation levels. Generally speaking, the above-discussed isolation requirements that are most difficult to meet are the in-column isolation levels and the cross-column isolation levels for adjacent columns of radiating elements, due to close physical proximity of the radiators in these situations. Herein, the cross-column co-polarization coupling (or isolation) for two adjacent columns of radiating elements is referred to as the adjacent cross-column co-polarization coupling (or isolation), and the cross-column cross-polarization coupling (or isolation) for two adjacent columns of radiating elements is referred to as the adjacent cross-column cross-polarization coupling (or isolation). While much of the in-column coupling occurs within the antenna array (i.e., coupling between the radiators or the feedboards on which the radiators are mounted), the inventors of the present application appreciated that port-to-port coupling may also occur in other locations, including on the calibration circuit board. The beamforming base station antennas according to embodiments of the present invention rearrange the connections to the calibration circuit boards thereof to reduce in-column coupling and/or cross-column isolation levels for adjacent columns of radiating elements. By reducing in-column coupling and/or cross-column isolation levels for adjacent columns of radiating elements, it may be much easier to meet the isolation requirements.

The base station antennas according to some embodiments of the present invention may include a calibration circuit that has a plurality of pairs of directional couplers and an antenna array that includes a plurality of columns of radiating elements. For each column of radiating elements, first polarization radiators of the radiating elements in the column are electrically connected to a first directional coupler of a respective one of the pairs of directional couplers, and second polarization radiators of the radiating elements in the column are electrically connected to a second directional coupler of the respective one of the pairs of directional couplers. The directional couplers may be arranged in a manner that reduces in-column coupling and/or that reduces cross-column coupling between adjacent columns of radiating elements.

In some embodiments, a first directional coupler in a first of the pairs of directional couplers may only be adjacent directional couplers in pairs of directional couplers other than the first of the pairs of directional couplers. In other embodiments, at least two directional couplers that are part of pairs of directional couplers other than the second pair of directional couplers are interposed between the two directional couplers in the second of the pairs of directional couplers. Additionally or alternatively, the first directional coupler in the first of the pairs of directional couplers may be interposed between the two directional couplers that form a second of the pairs of directional couplers.

In some embodiments, each directional coupler in each of the pairs of directional couplers is only adjacent directional couplers that are in other of the pairs of directional couplers.

In some embodiments, for each of the pairs of directional couplers, at least one of the directional couplers in another one of the pairs of directional couplers is interposed between the two directional couplers in the pair of directional couplers. In other embodiments, at least two of the directional couplers from one or more of the other pairs of directional couplers are interposed between the two directional couplers in each pair of directional couplers.

In some embodiments, the first directional coupler in the first of the pairs of directional couplers is electrically connected to a first of the columns of radiating elements and is only adjacent directional couplers that are in pairs of directional couplers that are electrically connected to columns of radiating elements that are not adjacent the first of the columns of radiating elements. In some embodiments, the directional couplers in the pairs of directional couplers are positioned so that no set of two adjacent directional couplers are electrically connected to adjacent columns of radiating elements.

Aspects of the present invention will now be in discussed in greater detail with reference to FIGS. 2-9, which illustrate example embodiments of base station antennas according to the present invention or components thereof.

Figure 2:
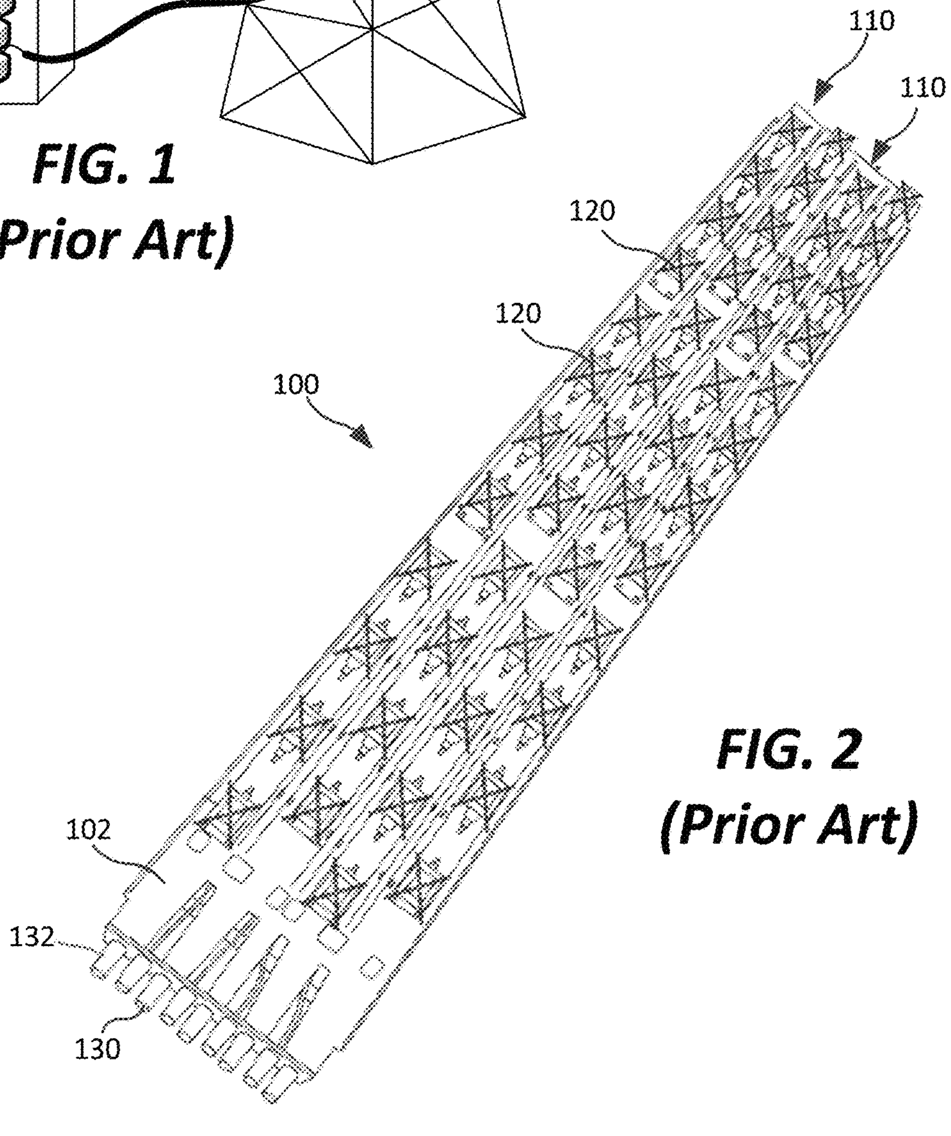
FIG. 2 (Prior Art)
FIG. 2 is a schematic perspective view of a beamforming antenna with the radome removed.

FIG. 2 is a schematic perspective view of a beamforming antenna 100. The beamforming antenna 100 may be a conventional beamforming antenna (if it includes conventional connections between the RF ports, calibration circuit board and multi-column antenna array), or may be a beamforming antenna according to embodiments of the present invention (if it includes any of the connection schemes disclosed herein for interconnecting the RF ports, calibration circuit board and multi-column antenna array).

As shown in FIG. 2, the beamforming antenna 100 has four columns 110 of dual-polarized radiating elements 120 that are mounted on a planar backplane 102. Each column 110 of radiating elements 120 has the same azimuth boresight pointing angle. The antenna 100 includes a total of RF eight ports 130, namely two RF ports 130 for each column (a port for each polarization), along with a ninth port 132 for calibration. A housing (not shown) that includes a radome, a top end cap and a bottom end cap is mounted to surround the assembly shown in FIG. 2 to provide environmental protection. The RF ports 130 are typically mounted in the bottom end cap. While FIG. 2 illustrates a beamforming antenna that includes external RF ports that can be connected to beamforming radio that is external to the antenna (or mounted on the back of the antenna), it will be appreciated that the concepts disclosed herein are equally applicable to active antennas that include integrated beamforming radios.

Figure 3A:
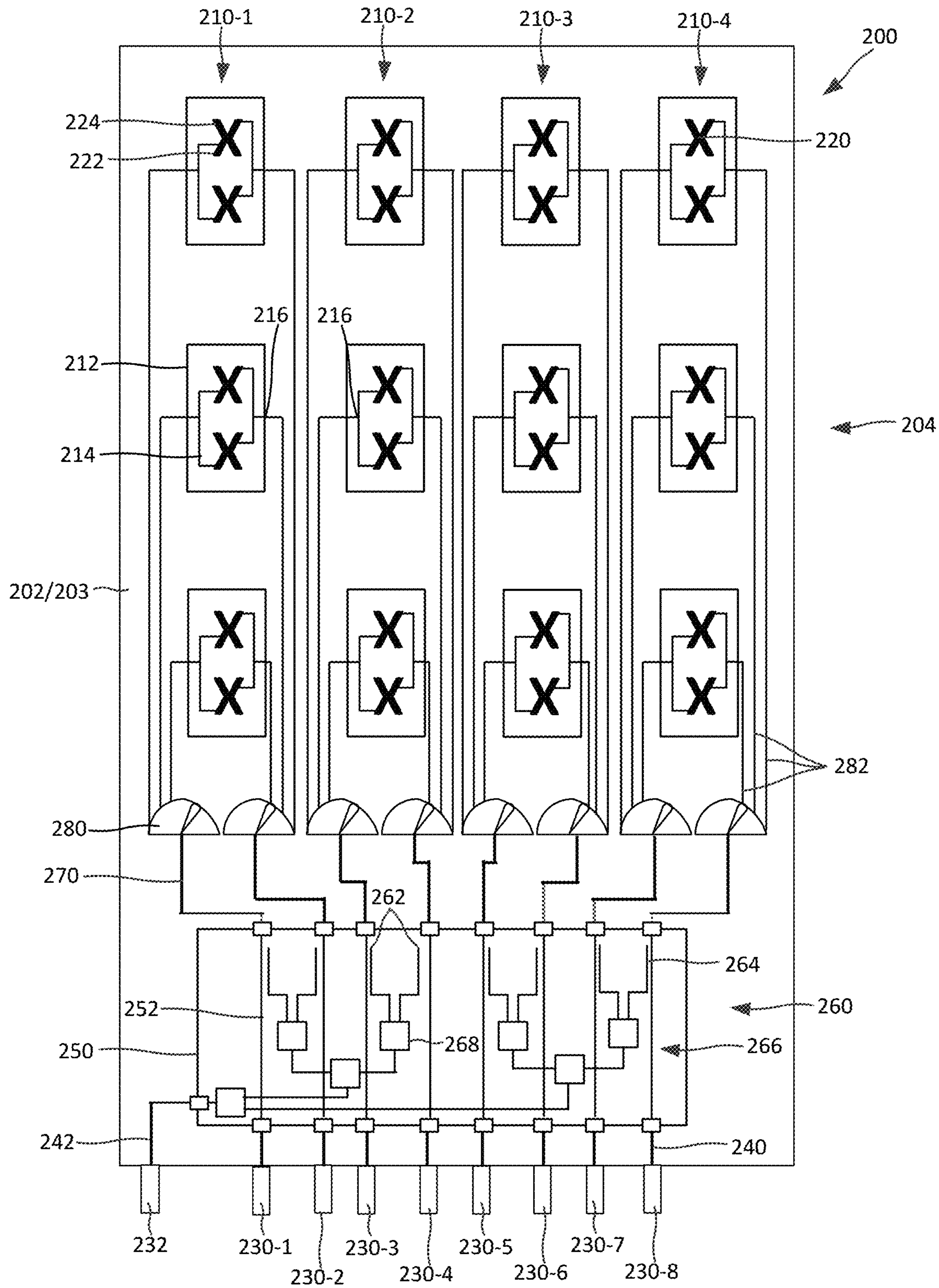
FIG. 3A (Prior Art)
FIG. 3A is a schematic diagram illustrating a base station antenna having a conventional calibration circuit.

FIG. 3A is a schematic diagram illustrating a base station antenna 200. The base station antenna 200 may comprise the base station antenna 100 of FIG. 2 implemented with conventional connections between the RF ports, calibration circuit board and multi-column antenna array.

As shown in FIG. 3A, the base station antenna 200 includes a beamforming antenna array 204 that has four columns 210-1 through 210-4 of dual-polarized radiating elements 220. Each radiating element 220 may extend forwardly from a backplane 202. The backplane 202 may comprise or include a reflector 203, which may be implemented as a flat metal or metallized surface. The reflector 203 may serve as a ground plane for the radiating elements 220 and may also reflect forwardly RF radiation that is emitted backwardly by the radiating elements 220. The radiating elements 220 are mounted on feedboard printed circuit boards 212 (referred to herein as feedboards 212). RF transmission lines 214 and power dividers 216 on the feedboards 212 may split RF signals input to the feedboards 212 and deliver the split components of the RF signal to either the first polarization radiators 222 or the second polarization radiators 224 of the radiating elements 220.

Any appropriate radiating elements 220 may be used. In an example embodiment, each radiating element 220 may comprise a slant −45°/+45° cross-dipole radiating element that includes a feed stalk and a −45° dipole radiator and a +45° dipole radiator mounted in a cross configuration on a front end of the feed stalk. In other embodiments, dual-polarized patch radiating elements may be used.

Each column 210 of radiating elements 220 may be oriented generally vertically with respect to the horizon when the base station antenna 200 is mounted for use. In the depicted embodiment, each column 210 includes a total of six radiating elements 220. It will be appreciated, however, that other numbers of radiating elements 220 may be included in each column 210, and that different numbers of columns 210 may be included in the antenna 200.

The base station antenna 200 also includes eight RF ports 230-1 through 230-8 and a calibration port 232. RF signals may be coupled between the RF ports 230 and the columns 210 of radiating elements 220. Since dual-polarized radiating elements 220 are provided, two RF ports 230 are associated with each column 210, namely a first RF port 230 that feeds the first polarization radiators 222 (e.g., −45° dipoles) of the radiating elements 220 in the column 210 and a second RF port 230 that feeds the second polarization radiators 224 (e.g., +45° dipoles) of the radiating elements 220 in the column 210.

Eight input cables 240, which may be implemented, for example, as coaxial cables, may be provided that connect each of the RF ports 230 to a calibration circuit board 250. Typically, each input cable 240 is soldered to a respective input fixture (shown as small boxes on a lower edge of calibration circuit board 250 in FIG. 3A) on the calibration circuit board 250 to provide an electrical path between each input cable 240 and corresponding RF transmission lines 252 on the calibration circuit board 250. Each RF transmission line 252 may extend between a respective one of the input fixtures and a respective one of a plurality of output fixtures (shown as small boxes on an upper edge of calibration circuit board 250 in FIG. 3A). Each output fixture may receive a respective one of a plurality of jumper cables 270 that extend between the calibration circuit board 250 and a plurality of electromechanical phase shifters 280, as will be discussed in further detail below.

A calibration circuit 260 is provided on the calibration printed circuit board 250. The calibration circuit 260 may include, for example, a plurality of directional couplers 262, where the number of directional couplers 262 may correspond to the number of RF ports 230 (e.g., eight directional couplers in the example of FIG. 3A), along with a calibration combiner 266. Each directional coupler 262 may be used to extract a small amount of any RF signal that passes along a respective one of the RF transmission lines 252. In the depicted embodiment, each directional coupler 262 is implemented as a trace 264 that extends generally in parallel next to a respective one of the RF transmission lines 252. When an RF signal travels along one of the RF transmission lines 252, a small portion of the RF energy will electromagnetically couple to the trace 264 so that together the trace 264 and the adjacent segment of the RF transmission line 252 form the directional coupler 262. The trace 264 may be referred to herein as the "tap port" of the directional coupler 262 as a small portion of the RF signal travelling along the RF transmission line 252 is tapped off to the trace 264.

As can further be seen in FIG. 3A, the calibration combiner 266 is implemented using seven 2×1 combiners 268 that together combine any RF signals present at the outputs of the eight directional couplers 262 into a single RF signal. As shown, the traces 264 of each set of two adjacent directional couplers 262 connect to the inputs of a respective one of four of the 2×1 combiners 268. A fifth 2×1 combiner 268 is used to combine the outputs of the first and second 2×1 combiners 268, and a sixth 2×1 combiner 268 is used to combine the outputs of the third and fourth 2×1 combiners 268. The seventh 2×1 combiner 268 combines the outputs of the fifth and sixth 2×1 combiners 268. Each 2×1 combiner 268 may be implemented using any conventional power coupler. For example, Wilkinson power couplers may be used to implement the combiners 268. The calibration circuit board 250 may include crossover structures (not shown) that allow transmission line traces on the calibration circuit board 250 to cross each other in an electrically isolated manner. The output of the seventh 2×1 combiner 268 connects to a calibration fixture, and a calibration cable 242 connects the calibration fixture to the calibration port 232 on the antenna 200.

Each output fixture on the calibration circuit board 250 receives a respective jumper cable 270 that connects the output fixture to a respective one of a plurality of phase shifters 280. Each phase shifter 280 is configured to split RF signals provided at an input port thereof into a plurality of sub-components, and to then apply an adjustable phase progression to the RF sub-components. The outputs of each phase shifter 280 connect to the feed boards 212 of a respective column 210 of radiating elements in order to allow RF signals to pass between the phase shifters 280 and the feed boards 212. Each column 210 has an associated first polarization phase shifter 280 and an associated second polarization phase shifter 280. The first polarization phase shifter 280 for each column has three outputs that connect (via three respective phase cables 282) to respective ones of the RF transmission lines 214 that are provided on each the three feed boards 212 in the column 210. Each RF transmission line 214 passes through a respective splitter 216 so that the RF transmission line 214 may connect to the first polarization radiators 222 of each of the two radiating elements 220 that is mounted on the feed board 212. In this fashion, each output of the first polarization phase shifter 280 may be connected to the first polarization radiators 222 of the two radiating elements 220 on a respective one of the feed boards 212. Similarly, the second polarization phase shifter 280 for each column 210 has three outputs that connect (via respective phase cables 282) to respective RF transmission lines 214 that are provided on each the three feed boards 212 in the column 210. Each RF transmission line 214 passes through a respective splitter 216 so that the RF transmission line 214 may connect to the second polarization radiators 224 of each of the two radiating elements 220 that are mounted on the feed board 212. In this fashion, each output of the second polarization phase shifter 280 may be connected to the second polarization radiators 224 of the two radiating elements 220 on a respective one of the feed boards 212.

As discussed above, the calibration circuit 260 is used to identify any unintended variations in the amplitude and/or phase of the RF signals that are input to the RF ports 230 of the beamforming antenna 200. In particular, the calibration circuit 260 extracts a small amount of each of the RF signals that are input to antenna 200 and then combines these extracted "calibration" signals and passes them back to the radio that generated the RF signals. The radio may use this information to ensure that the amplitude and phase weights that are applied to the RF signals transmitted to the various columns 210 of radiating elements 220 provide optimized antenna beams.

Figure 3B:
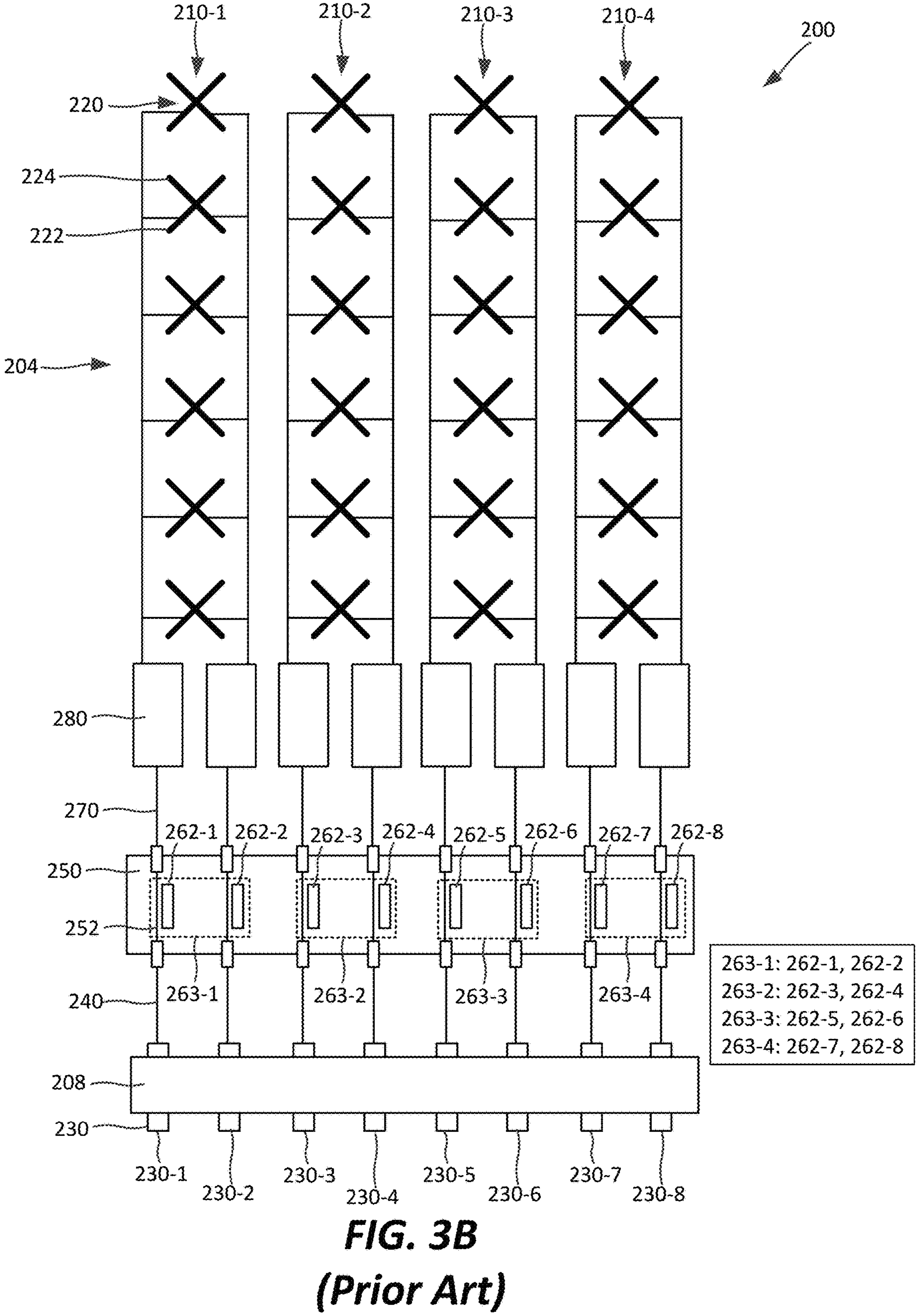
FIG. 3B (Prior Art)
FIG. 3B is a block diagram that illustrates the connections in the conventional base station antenna of FIG. 3A between the RF ports, calibration circuit and antenna array.

FIG. 3B is a schematic diagram illustrating selected of the components included in the base station antenna 200 of FIG. 3A, that also shows the bottom end cap 208 of the antenna 200. As shown, the RF connector ports 230 may be mounted to extend through the bottom end cap 208. The RF ports 230 may be arranged in any order on the end cap 208 (e.g., in a single row, in two rows, in two offset rows, etc.). The RF ports 230 may be implemented using single port connectors or multi-port connectors where a plurality of connectors are ganged together so that multiple connectors may be connected or disconnected at the same time. Each RF port 230 may be coupled to a corresponding port of a multi-port radio (not shown) by a jumper cable (not shown).

The two directional couplers 262 of calibration circuit 260 may be viewed as comprising four pairs 263 of directional couplers 262. Each pair 263 of directional couplers 262 includes a first polarization directional coupler (namely directional couplers 262-1, 262-3, 262-5, 262-7) that is electrically connected to the first polarization radiators 222 of the radiating elements 220 in a respective one of the columns 210, and a second polarization directional coupler (namely directional couplers 262-2, 262-4, 262-6, 262-8) that is electrically connected to the second polarization radiators 224 of the radiating elements 220 in the respective one of the columns 210. The legend in FIG. 3B shows which directional couplers 262 are in each of the pairs 263 of directional couplers 262 that feed the four columns 210 of radiating elements 220.

As can be seen, the directional couplers 262 of each pair 263 are positioned adjacent each other on the calibration circuit board 250. Additionally, pairs 263 of directional couplers (e.g., pairs 263-2 and 262-3) that are associated with adjacent columns 210 (e.g., columns 210-2 and 210-3) of the antenna array 204 are also located adjacent each other. In order to reduce the cost and weight of the antenna 200, the calibration circuit board 250 is typically made to be as small as possible. As such, adjacent RF transmission lines 252 and directional couplers 262 on the calibration circuit board 250 may be in close proximity and may exhibit non-negligible amounts of coupling therebetween. Coupling between the adjacent RF transmission lines 252 and directional couplers 262 of a pair 263 reduces the in-column isolation, and coupling between two adjacent RF transmission lines 252 and directional couplers 262 that are associated with adjacent columns 210 of antenna array 204 reduces the adjacent cross-column isolation (here the adjacent cross-column cross-polarization isolation).

Figure 4:
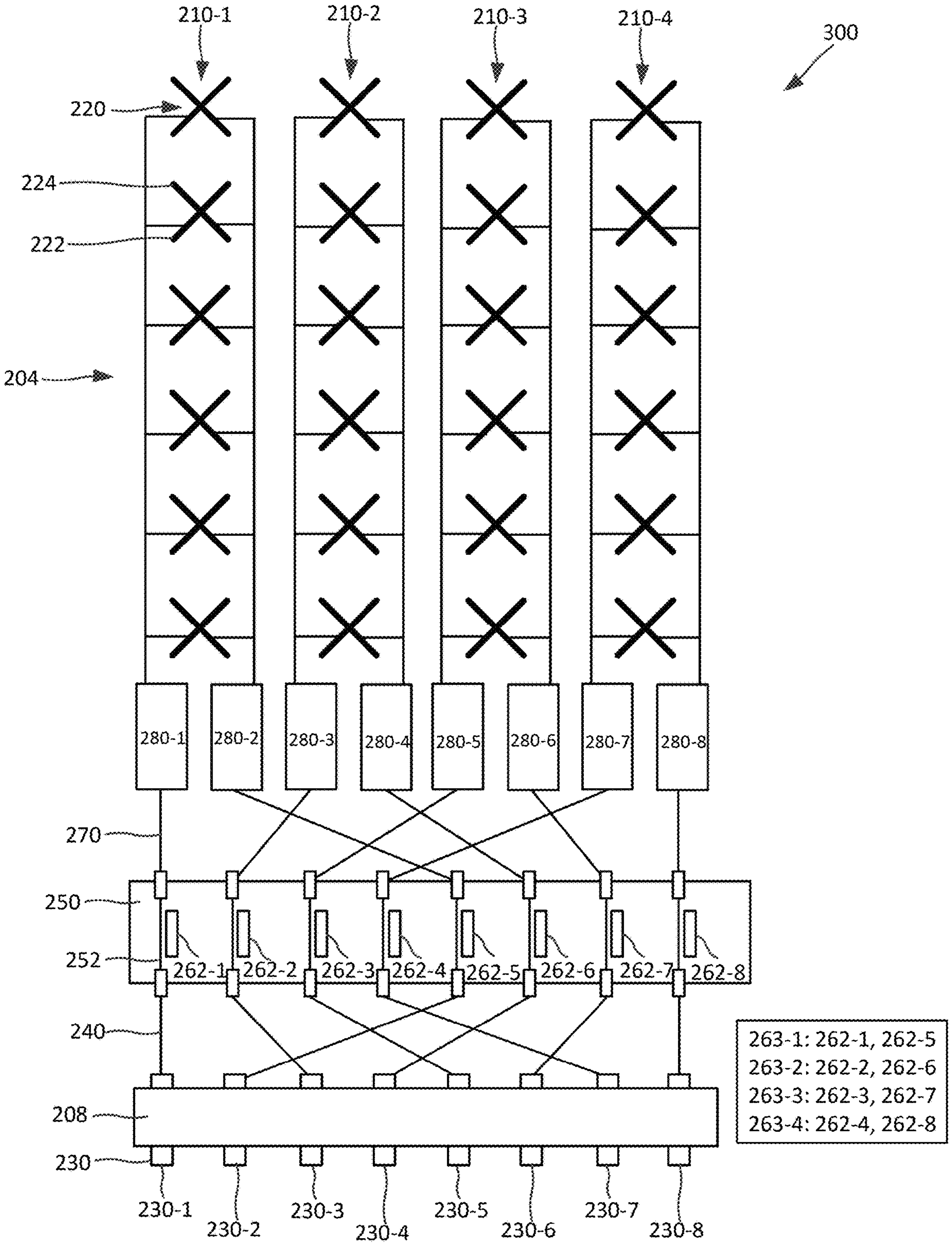
FIG. 4 is a block diagram that illustrates the connections between the RF ports, calibration circuit and antenna array in a base station antenna according to embodiments of the present invention.

FIG. 4 is a schematic diagram of a base station antenna 300 according to embodiments of the present invention. The base station antenna 300 may comprise the base station antenna 100 of FIG. 2 implemented with connections between the RF ports, calibration circuit board and multi-column antenna array according to embodiments of the present invention.

As can be seen by comparing FIGS. 3B and 4, base station antenna 300 has similarities to base station antenna 200 of FIGS. 3A-3B. Consequently, description of aspects of base station antenna 300 that are the same as base station antenna 200 and that have been discussed above are omitted.

As can be seen, the difference between base station antenna 300 and base station antenna 200 is in the connections between the RF ports 230 and the directional couplers 262 of the calibration circuit 260 and in the connections between the directional couplers 262 of the calibration circuit 260 and the phase shifters 280 and columns 210 of radiating elements 220. In some embodiments, the calibration circuit board 250 included in base station antenna 300 may be identical to the calibration circuit board 250 included in base station antenna 200. In such embodiments, the RF cables 240 and the RF cables 270, for example, may be connected differently.

As shown in FIG. 4, the RF cables 240 are connected so that RF port 230-1 is electrically connected to directional coupler 262-1, RF port 230-2 is electrically connected to directional coupler 262-5, RF port 230-3 is electrically connected to directional coupler 262-2, RF port 230-4 is electrically connected to directional coupler 262-6, RF port 230-5 is electrically connected to directional coupler 262-3, RF port 230-6 is electrically connected to directional coupler

262-7, RF port 230-7 is electrically connected to directional coupler 262-4, and RF port 230-8 is electrically connected to directional coupler 262-8.

As is further shown in FIG. 4, the RF cables 270 are connected so that directional coupler 262-1 is electrically connected to the first polarization radiators 222 of the radiating elements in column 210-1, directional coupler 262-5 is electrically connected to the second polarization radiators 224 of the radiating elements in column 210-1, directional coupler 262-2 is electrically connected to the first polarization radiators 222 of the radiating elements in column 210-3, directional coupler 262-6 is electrically connected to the second polarization radiators 224 of the radiating elements in column 210-2, directional coupler 262-3 is electrically connected to the first polarization radiators 222 of the radiating elements in column 210-3, directional coupler 262-7 is electrically connected to the second polarization radiators 224 of the radiating elements in column 210-3, directional coupler 262-4 is electrically connected to the first polarization radiators 222 of the radiating elements in column 210-4, and directional coupler 262-8 is electrically connected to the second polarization radiators 224 of the radiating elements in column 210-4.

As shown in the legend in FIG. 4, in base station antenna 300, the first pair 263-1 of directional couplers that feed the first column 210-1 of radiating elements comprises directional couplers 262-1 and 262-5, the second pair 263-2 of directional couplers that feed the second column 210-2 of radiating elements comprises directional couplers 262-2 and 262-6, the third pair 263-3 of directional couplers that feed the third column 210-3 of radiating elements comprises directional couplers 262-3 and 262-7, and the fourth pair 263-1 of directional couplers that feed the fourth column 210-4 of radiating elements comprises directional couplers 262-4 and 262-8.

As can be seen in FIG. 4, none of the directional couplers 262 that feed the first polarization radiators 222 of the radiating elements 220 in a column 210 are adjacent directional couplers 262 that feed the second polarization radiators 222 of the radiating elements 220 for that same column 210. In fact, for each column 210, three directional couplers 262 that feed other columns 210 are interposed between the two directional couplers 262 that feed the column 210. For example, directional coupler 262-2 feeds the first polarization radiators 222 of the radiating elements 220 in column 210-2 and directional coupler 262-6 feeds the second polarization radiators 224 of the radiating elements 220 in column 210-2. Directional couplers 262-3 through 262-5 are interposed between directional couplers 262-2 and 262-6 such that three directional couplers 262 that feed columns 210 other than column 210-2 are interposed between the two directional couplers 262 that feed column 210-2. Since the same is true for all four columns 210, in-column coupling between the directional couplers 262 that feed a particular column and the associated RF transmission lines 252 that are part of those directional couplers 262 may substantially be eliminated.

While the base station antenna 300 of FIG. 4 provides significantly improved in-column isolation on the calibration circuit board 250, this improvement may come at the expense of increased adjacent cross-column coupling as compared to the conventional approach of FIG. 3B. In particular, referring again to FIG. 3B, it can be seen that there are a total of three instances where two adjacent directional couplers 262 are electrically connected to adjacent columns 210 of radiating elements 220, namely adjacent directional couplers 262-2, 262-3 (which are electrically connected to columns 210-1 and 210-2, respectively), adjacent directional couplers 262-4, 262-5 (which are electrically connected to columns 210-2 and 210-3, respectively), and adjacent directional couplers 262-7, 262-8 (which are electrically connected to columns 210-3 and 210-4, respectively). In each of these three instances, a directional coupler 262 that feeds the second polarization radiators 224 of a first column 210 is adjacent a directional coupler 262 that feeds the first polarization radiators 222 of a second, adjacent column 210. Thus, there are three instances where there will be relatively strong adjacent cross-column, cross-polarization coupling in base station antenna 200. It should be noted that since the coupling decreases exponentially with distance, the coupling between non-adjacent directional couplers 262 that are electrically connected to adjacent columns 210 of radiating elements 220 has negligible impact on overall isolation.

In comparison, the base station antenna 300 of FIG. 4 includes a total of six instances where two adjacent directional couplers 262 are electrically connected to adjacent columns 210 of radiating elements 220, namely adjacent directional couplers 262-1, 262-2 (which are electrically connected to columns 210-1 and 210-2, respectively), adjacent directional couplers 262-2, 262-3 (which are electrically connected to columns 210-2 and 210-3, respectively), adjacent directional couplers 262-3, 262-4 (which are electrically connected to columns 210-3 and 210-4, respectively), adjacent directional couplers 262-5, 262-6 (which are electrically connected to columns 210-1 and 210-2, respectively), adjacent directional couplers 262-6, 262-7 (which are electrically connected to columns 210-2 and 210-3, respectively), and adjacent directional couplers 262-7, 262-8 (which are electrically connected to columns 210-3 and 210-4, respectively). All six of these instances reduce adjacent cross-column, co-polarization isolation.

As the above description makes clear, base station antenna 300 includes a calibration circuit 260 that has a plurality of pairs 263 of directional couplers 262 and an antenna array 204 that includes a plurality of columns 210 of radiating elements 220. For each column 210, first polarization radiators 222 of the radiating elements 220 in the column 210 are electrically connected to a first directional coupler 262 of a respective one of the pairs 263 of directional couplers 262, and second polarization radiators 224 of the radiating elements 220 in the column 210 are electrically connected to a second directional coupler 262 of the respective one of the pairs 263 of directional couplers 262. Here, the first directional coupler 262 of the pair 263 may sometimes be referred to as a first polarization directional coupler and the second directional coupler 262 of the pair 263 may sometimes be referred to as a second polarization directional coupler based on the polarization of the radiators that the directional couplers electrically connect to.

A first directional coupler (e.g., 262-2) in a first of the pairs (263-2) of directional couplers may only be adjacent directional couplers (262-1 and 262-3) in pairs (263-1, 263-3) of directional couplers other than the first of the pairs (263-2) of directional couplers. Likewise, a first directional coupler (e.g., 262-2) in the first of the pairs (263-2) of directional couplers may be interposed between (although not necessarily directly in between) the two directional couplers (262-1, 262-5) that form a second of the pairs (263-1) of directional couplers. In fact, in this embodiment, a total of three directional couplers (262-2, 262-3, 262-4) of pairs (263-1, 263-3, 263-4) of directional couplers other than the second pair (263-2) of directional couplers are interposed between the two directional couplers (263-1, 263-5)

that form the second of the pairs (263-2) of directional couplers. Additionally, every one of the directional couplers 262-1 through 262-8 may only be adjacent directional couplers 262 that are in other of the pairs 263 of directional couplers 262. Moreover, for each of the pairs 263 of directional couplers 262, at least two of the directional couplers 262 from one or more of the other pairs 263 of directional couplers 262 may be interposed between the two directional couplers 262 in the pair 263 of directional couplers 262.

While the base station antenna 300 may improve in-column isolation at the expense of a reduction in adjacent cross-column isolation, this tradeoff may still be advantageous. In particular, it may be difficult to "tune" a base station antenna using parasitic elements where it is necessary to improve both in-column and adjacent cross-column isolation. If, by improving the in-column isolation in the manner discussed above with reference to FIG. 4 it is possible to meet the in-column isolation specifications, it may be easier to select parasitic element locations that bring the cross-column coupling levels within customer requirements.

Figure 5:
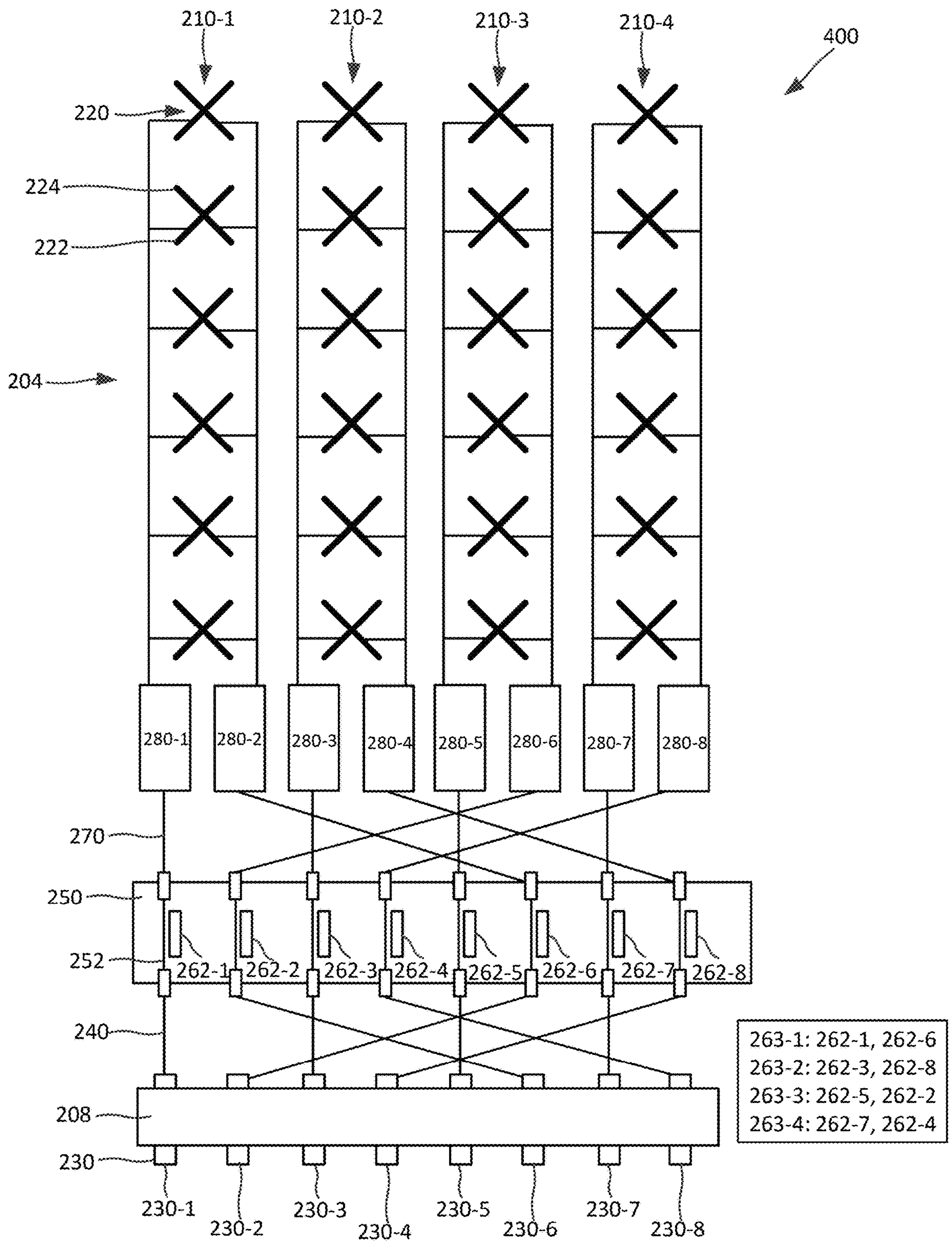
FIGS. 5 and 6 are block diagrams that illustrate the connections between the RF ports, calibration circuits and antenna arrays in two additional base station antennas according to embodiments of the present invention.
Figure 6:
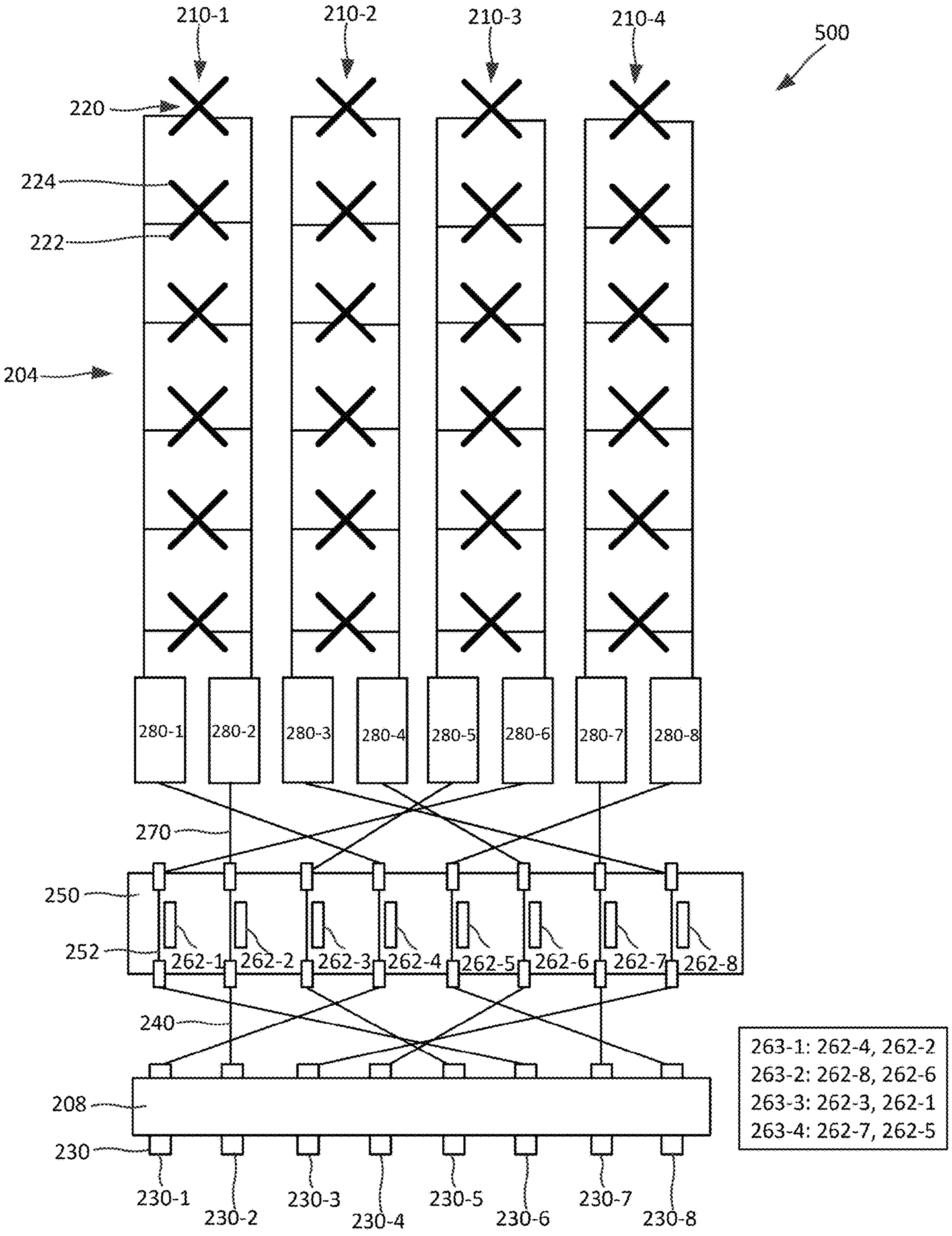

Pursuant to further embodiments of the present invention, base station antennas are provided that improve in-column isolation while also improving adjacent cross-column isolation as compared to base station antennas that have the conventional connection arrangement shown in FIG. 3B. FIGS. 5 and 6 illustrate example base station antennas that provide such improved in-column and adjacent cross-column isolation.

Referring to FIG. 5, a base station antenna 400 is schematically illustrated. The base station antenna 400 may be identical to base station antennas 200 and 300, discussed above, except that base station antenna 400 has different connections between the RF ports 230 and the directional couplers 262 of the calibration circuit 260 and different connections between the directional couplers 262 of the calibration circuit 260 and the columns 210 of radiating elements 220.

As shown in FIG. 5, the RF cables 240 are connected so that RF port 230-1 is electrically connected to directional coupler 262-1, RF port 230-2 is electrically connected to directional coupler 262-6, RF port 230-3 is electrically connected to directional coupler 262-3, RF port 230-4 is electrically connected to directional coupler 262-8, RF port 230-5 is electrically connected to directional coupler 262-5, RF port 230-6 is electrically connected to directional coupler 262-2, RF port 230-7 is electrically connected to directional coupler 262-7, and RF port 230-8 is electrically connected to directional coupler 262-4.

As is further shown in FIG. 5, the RF cables 270 are connected so that directional coupler 262-1 is electrically connected to the first polarization radiators 222 of the radiating elements in column 210-1, directional coupler 262-6 is electrically connected to the second polarization radiators 224 of the radiating elements in column 210-1, directional coupler 262-3 is electrically connected to the first polarization radiators 222 of the radiating elements in column 210-2, directional coupler 262-8 is electrically connected to the second polarization radiators 224 of the radiating elements in column 210-2, directional coupler 262-5 is electrically connected to the first polarization radiators 222 of the radiating elements in column 210-3, directional coupler 262-2 is electrically connected to the second polarization radiators 224 of the radiating elements in column 210-3, directional coupler 262-7 is electrically connected to the first polarization radiators 222 of the radiating elements in column 210-4, and directional coupler 262-4 is electrically connected to the second polarization radiators 224 of the radiating elements in column 210-4.

As shown in the legend in FIG. 5, in base station antenna 300, the first pair 263-1 of directional couplers that feed the first column 210-1 of radiating elements comprises directional couplers 262-1 and 262-6, the second pair 263-2 of directional couplers that feed the second column 210-2 of radiating elements comprises directional couplers 262-3 and 262-8, the third pair 263-3 of directional couplers that feed the third column 210-3 of radiating elements comprises directional couplers 262-5 and 262-2, and the fourth pair 263-1 of directional couplers that feed the fourth column 210-4 of radiating elements comprises directional couplers 262-7 and 262-4.

As can also be seen in FIG. 5, none of the directional couplers 262 that feed the first polarization radiators 222 of the radiating elements 220 in a column 210 are adjacent directional couplers 262 that feed the second polarization radiators 222 of the radiating elements 220 for that same column 210. Thus, in-column coupling between the directional couplers 262 that feed a particular column 210 and the associated RF transmission lines 252 that are part of those directional couplers 262 may substantially be eliminated.

The base station antenna 400 of FIG. 5 also provides reduced adjacent cross-column coupling as compared to the base station antenna 200 of FIG. 3B (which includes a total of three instances where two adjacent directional couplers 262 are electrically connected to adjacent columns 210 of radiating elements 220). In comparison, the base station antenna 400 of FIG. 5 only includes two instances where two adjacent directional couplers 262 are electrically connected to adjacent columns 210 of radiating elements 220, namely adjacent directional couplers 262-2, 262-3 (which are electrically connected to columns 210-3 and 210-4, respectively), and adjacent directional couplers 262-4, 262-5 (which are electrically connected to columns 210-4 and 210-3, respectively). Thus, base station antenna 400 may provide both improved in-column isolation and improved adjacent cross-column isolation as compared to base station antenna 200.

Referring to FIG. 6, a base station antenna 500 is schematically illustrated that may be identical to base station antennas 200 and 300, discussed above, except that base station antenna 500 again has different connections between the RF ports 230 and the directional couplers 262 of the calibration circuit 260 and different connections between the directional couplers 262 of the calibration circuit 260 and the columns 210 of radiating elements 220.

As shown in FIG. 6, the RF cables 240 are connected so that RF port 230-1 is electrically connected to directional coupler 262-4, RF port 230-2 is electrically connected to directional coupler 262-2, RF port 230-3 is electrically connected to directional coupler 262-8, RF port 230-4 is electrically connected to directional coupler 262-6, RF port 230-5 is electrically connected to directional coupler 262-3, RF port 230-6 is electrically connected to directional coupler 262-1, RF port 230-7 is electrically connected to directional coupler 262-7, and RF port 230-8 is electrically connected to directional coupler 262-5.

As is further shown in FIG. 6, the RF cables 270 are connected so that directional coupler 262-1 is electrically connected to the second polarization radiators 224 of the radiating elements in column 210-3, directional coupler 262-2 is electrically connected to the second polarization radiators 224 of the radiating elements in column 210-1, directional coupler 262-3 is electrically connected to the first polarization radiators 222 of the radiating elements in column 210-3, directional coupler 262-4 is electrically connected to the first polarization radiators 222 of the radiating elements in column 210-1, directional coupler 262-5 is electrically connected to the second polarization radiators 224 of the radiating elements in column 210-4, directional coupler 262-6 is electrically connected to the second polarization radiators 224 of the radiating elements in column 210-2, directional coupler 262-7 is electrically connected to the first polarization radiators 222 of the radiating elements in column 210-4, and directional coupler 262-8 is electrically connected to the first polarization radiators 222 of the radiating elements in column 210-2.

As shown in the legend in FIG. 6, in base station antenna 300, the first pair 263-1 of directional couplers that feed the first column 210-1 of radiating elements comprises directional couplers 262-4 and 262-2, the second pair 263-2 of directional couplers that feed the second column 210-2 of radiating elements comprises directional couplers 262-8 and 262-6, the third pair 263-3 of directional couplers that feed the third column 210-3 of radiating elements comprises directional couplers 262-3 and 262-1, and the fourth pair 263-1 of directional couplers that feed the fourth column 210-4 of radiating elements comprises directional couplers 262-7 and 262-5.

None of the directional couplers 262 that feed the first polarization radiators 222 of the radiating elements 220 in a column 210 are adjacent directional couplers 262 that feed the second polarization radiators 222 of the radiating elements 220 for that same column 210. Thus, in-column coupling between the directional couplers 262 that feed a particular column and the associated RF transmission lines 252 that are part of those directional couplers 262 may substantially be eliminated. Additionally, the base station antenna 500 of FIG. 6 does not include any instance where two adjacent directional couplers 262 are electrically connected to adjacent columns 210 of radiating elements 220. Thus, the base station antenna 500 also substantially eliminates adjacent cross-column coupling on the calibration circuit board 250.

As the above description makes clear, base station antenna 500 includes a calibration circuit 260 that has a plurality of pairs 263 of directional couplers 262 and an antenna array 204 that includes a plurality of columns 210 of radiating elements 220. For each column 210, first polarization radiators 222 of the radiating elements 220 in the column 210 are electrically connected to a first directional coupler 262 of a respective one of the pairs 263 of directional couplers 262, and second polarization radiators 224 of the radiating elements 220 in the column 210 are electrically connected to a second directional coupler 262 of the respective one of the pairs 263 of directional couplers 262. Each directional coupler 262 in each of the pairs 263 of directional couplers 262 is only adjacent directional couplers 262 that are in other of the pairs 263 of directional couplers 262. Additionally, the directional couplers 262 are positioned so that no combination or "set" of two adjacent directional couplers 262 are electrically connected to adjacent columns 210 of radiating elements 220. Thus, by definition the calibration circuit board 250 of base station antenna 500 does not generate adjacent cross-column coupling, since every combination of two adjacent directional couplers 262 are electrically connected to non-adjacent columns 210 of radiating elements 220.

FIGS. 7A-7D are schematic diagrams that illustrate and compare the in-column, adjacent cross-column co-polarization and adjacent cross-column cross-polarization performance of the calibration circuit boards 250 of the base station antennas 200, 300, 400, 500 of FIGS. 3B, 4, 5 and 6, respectively. Each figure illustrates the positioning of the directional couplers 262-1 through 262-8 on the calibration circuit board 250, and shows which column 210 of radiating elements 220 each directional coupler 262 is electrically connected to. A column number that includes an "A" suffix (e.g., column 210-2A) indicates that the direction coupler 262 is coupled to the first polarization radiators 222 of the radiating elements 220 in the column 210, and a column number that includes a "B" suffix (e.g., column 210-2B) indicates that the direction coupler 262 is coupled to the second polarization radiators 224 of the radiating elements 220 in the column 210. The rectangular boxes that surround selected pairs of directional couplers indicate two adjacent directional coupler 262 that substantially contribute to in-column or adjacent cross-column coupling. The rectangular boxes formed using solid lines identify each set of two adjacent directional couplers 262 that substantially contribute to in-column coupling, the rectangular boxes formed using dotted lines identify each set of two adjacent directional couplers 262 that substantially contribute to adjacent cross-column co-polarization coupling, and the rectangular boxes formed using dashed lines identify each set of two adjacent directional couplers 262 that substantially contribute to adjacent cross-column cross-polarization coupling.

Figure 7A:
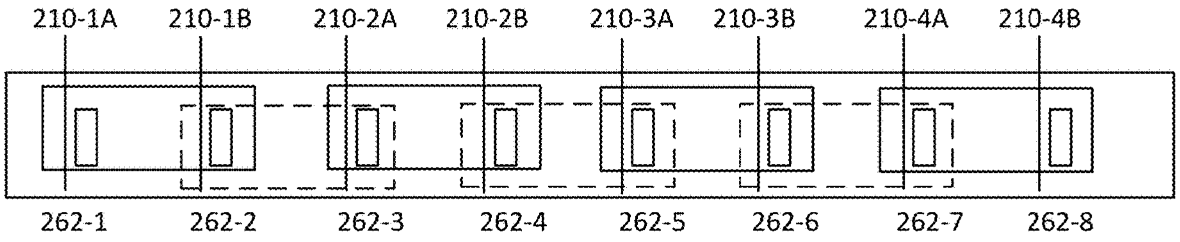
FIG. 7A (Prior Art)
FIGS. 7A-7D are schematic diagrams that illustrate and compare the in-column, adjacent cross-column co-polarization and adjacent cross-column cross-polarization coupling in the calibration circuits of the base station antennas of FIGS. 3B, 4, 5 and 6, respectively.

As shown in FIG. 7A, conventional base station antenna 200 includes four instances where two adjacent directional couplers 262 substantially contribute to in-column coupling, no instances where two adjacent directional couplers 262 substantially contribute to adjacent cross-column co-polarization coupling, and three instances where two adjacent directional couplers 262 substantially contribute to adjacent cross-column cross-polarization coupling.

Figure 7B:
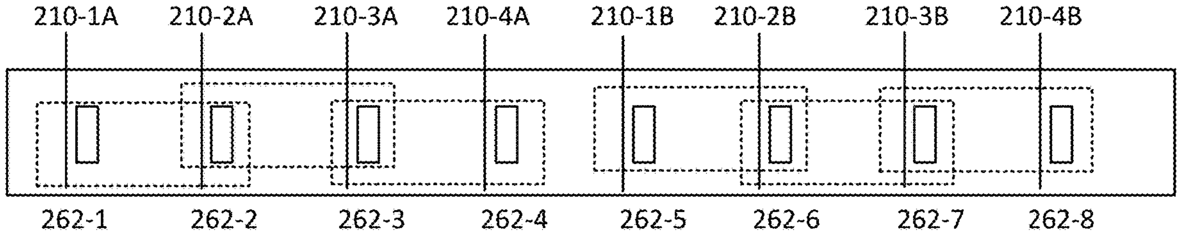

As shown in FIG. 7B, base station antenna 300 includes no instances where two adjacent directional couplers 262 substantially contribute to in-column coupling, six instances where two adjacent directional couplers 262 substantially contribute to adjacent cross-column co-polarization coupling, and no instances where two adjacent directional couplers 262 substantially contribute to adjacent cross-column cross-polarization coupling.

Figure 7C:
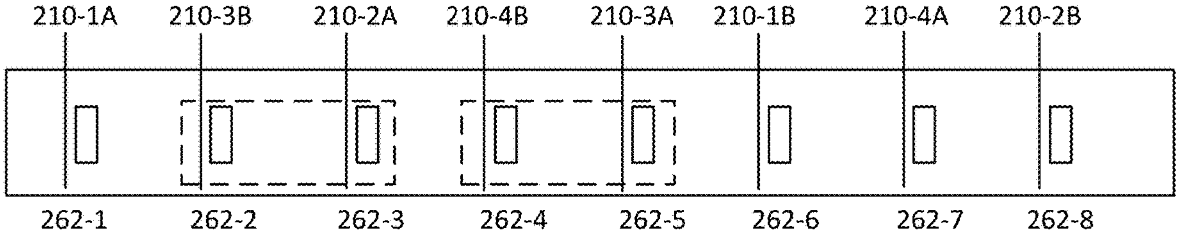

As shown in FIG. 7C, base station antenna 400 includes no instances where two adjacent directional couplers 262 substantially contribute to in-column coupling, no instances where two adjacent directional couplers 262 substantially contribute to adjacent cross-column co-polarization coupling, and two instances where two adjacent directional couplers 262 substantially contribute to adjacent cross-column cross-polarization coupling.

Figure 7D:
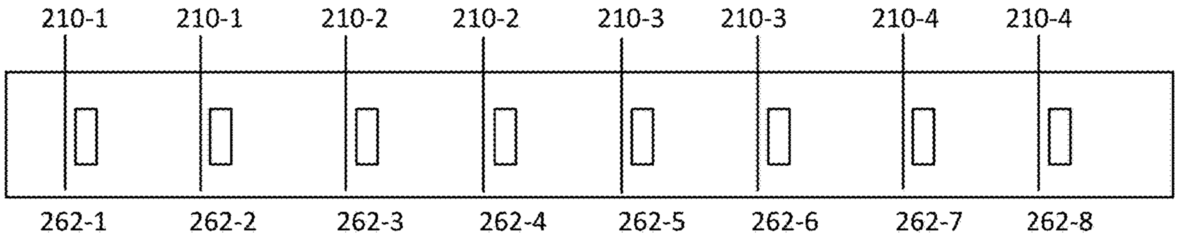

As shown in FIG. 7D, base station antenna 500 includes no instances where two adjacent directional couplers 262 substantially contribute to any of in-column coupling, adjacent cross-column co-polarization coupling or adjacent cross-column cross-polarization coupling.

It will be appreciated that a wide variety of calibration circuit designs may be used in the base station antennas according to embodiments of the present invention. FIGS. 8A-8D illustrate four examples of different calibration circuit designs.

Figure 8A:
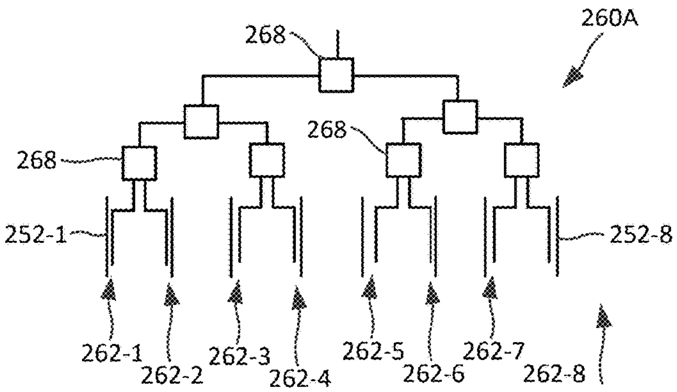
FIGS. 8A-8D are schematic diagrams of example calibration circuits that can be used in the base station antennas according to embodiments of the present invention.

As shown in FIG. 8A, a first calibration circuit 260A may have the design of the conventional base station antenna 200 of FIGS. 3A-3B. In this design, the eight directional couplers 262-1 through 262-8 are aligned in a single row and the 2×1 combiners 268 that combine the outputs of the eight directional couplers 262 are positioned above the directional couplers 262. In calibration circuit 260A, directional couplers 262-2 through 262-6 are each adjacent two directional couplers 262, and directional couplers 262-1 and 262-8 are each only adjacent one other directional coupler 262.

Figure 8B:
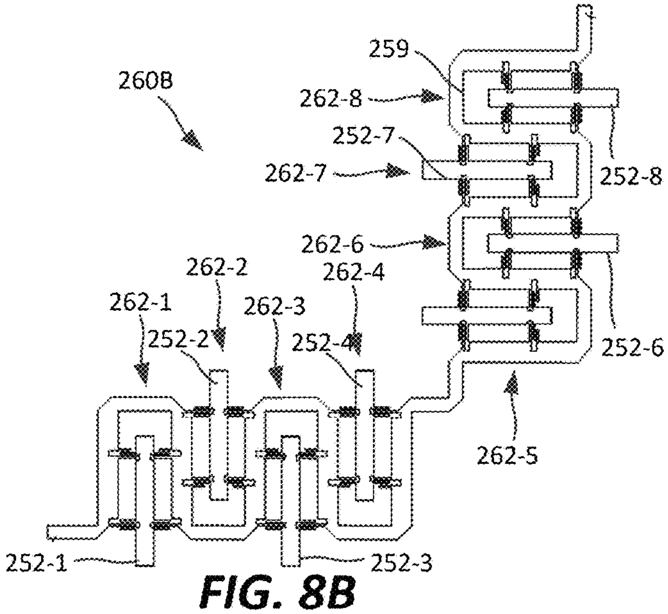

As shown in FIG. 8B, a second calibration circuit 260B may have a so-called "snake" design. In such a calibration circuit, the tap ports of each directional coupler 262 are connected by curved RF transmission line segments 269 to form a continuous RF transmission line that serves as a calibration combiner. The tapped RF energy is combined along this continuous RF transmission line. In the embodiment of FIG. 8B, the snake calibration circuit includes a 90° bend so that RF transmission lines 252-1 through 252-4 are perpendicular to RF transmission lines 252-5 through 252-8. It will be appreciated that this 90° bend may be omitted in other embodiments so that all of the RF transmission lines 252 extend in parallel, or that additional bends and/or bends of different angles may be provided. In calibration circuit 260B, directional couplers 262-2 through 262-6 again are each adjacent two directional couplers 262, and directional couplers 262-1 and 262-8 are each only adjacent one other directional coupler 262.

Figure 8C:
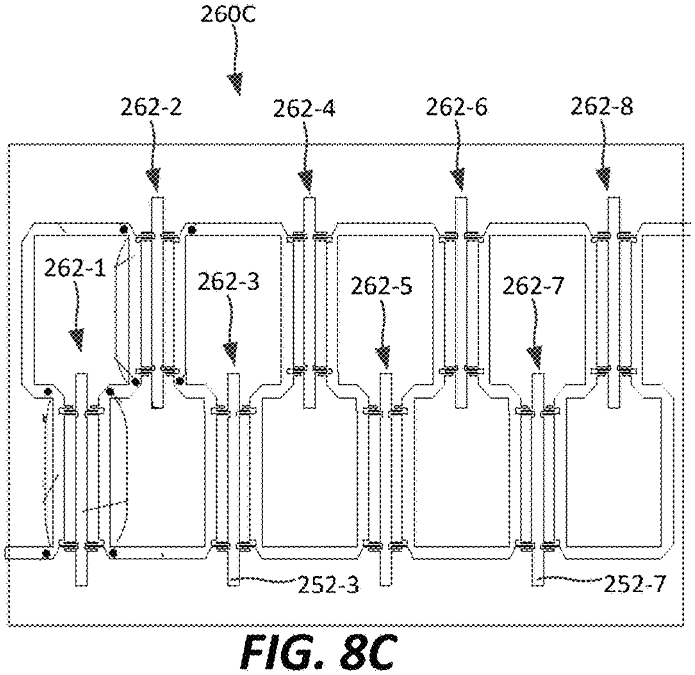

As shown in FIG. 8C, a third calibration circuit 260C may again have a snake design like calibration circuit 260B. However, in calibration circuit 260C, the RF transmission lines 252 are arranged in two horizontal rows, which can result in a more compact calibration circuit. In calibration circuit 260C, directional couplers 262-3 through 262-5 are each adjacent four directional couplers 262 (e.g., directional coupler 262-4 is adjacent directional couplers 262-2, 262-3, 262-5 and 262-6), directional couplers 262-2 and 262-7 are each adjacent three other directional couplers 262 (e.g., directional coupler 262-2 is adjacent directional couplers 262-1, 262-3 and 262-4), and directional couplers 262-1 and 262-8 are each adjacent two other directional coupler 262 (e.g., directional coupler 262-8 is adjacent directional couplers 262-6 and 262-7).

Figure 8D:
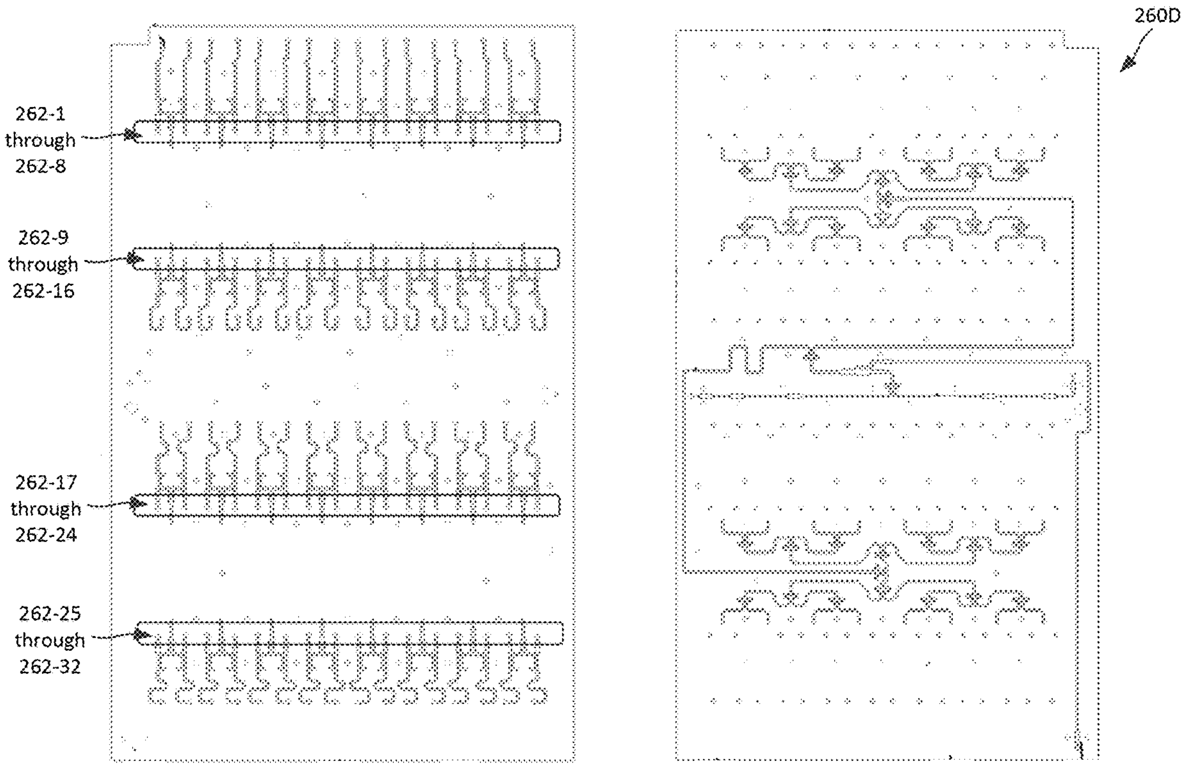

FIG. 8D illustrates a fourth calibration circuit 260D that is implemented on two different sides of a calibration circuit board (both sides are illustrated in FIG. 8D). Calibration circuit 260D has the general design of calibration circuit 260A, except that calibration circuit 260D includes thirty-two directional couplers 262 which are arranged in four horizontal rows of eight directional couplers each. It will be appreciated that base station antennas having calibration circuits with any number of directional couplers (e.g., 8, 16, 32, 64, etc.) may be improved using the connection techniques disclosed herein so that the directional couplers are arranged to reduce or even eliminate in-column and/or adjacent cross-column coupling on the calibration circuit board. As one example, the connection techniques discussed above with references to FIGS. 4-6 could be used on each of the four rows of directional couplers 262 in calibration circuit 260D to reduce or eliminate in-column and/or adjacent cross-column coupling. Since each row of directional couplers 262 is spaced apart from the other three rows of directional couplers 262, each directional coupler is only adjacent either one or two other directional couplers in the calibration circuit 260D.

As described above, in various of the embodiments of the present invention, certain of the directional couplers are arranged to not be adjacent other of the directional couplers, or the directional couplers are arranged so that one or more directional couplers are interposed between another two of the directional couplers. Herein, first and second directional couplers are considered to be "adjacent" each other if (1) no intervening directional coupler is in between the central portions of the first and second directional couplers and (2) the first and second directional couplers are closely spaced together so that non-trivial amounts of electrical coupling will occur between the first and second directional couplers. The central portion of a directional coupler is defined as the middle half of the two coupling trace segments that form the directional coupler, or an equivalent region for directional couplers that comprise structures other than coupling trace segments. A third directional coupler is considered to be "interposed" between first and second directional couplers if the first through second directional couplers are substantially in a row with the third directional coupler and the third directional coupler is in between the first and second directional couplers. For example, in FIGS. 8A and 8B, directional coupler 262-2 is interposed between directional couplers 261-1 and 262-3, and in FIG. 8C, directional coupler 262-3 is interposed between directional couplers 261-1 and 262-5.

Figure 9:
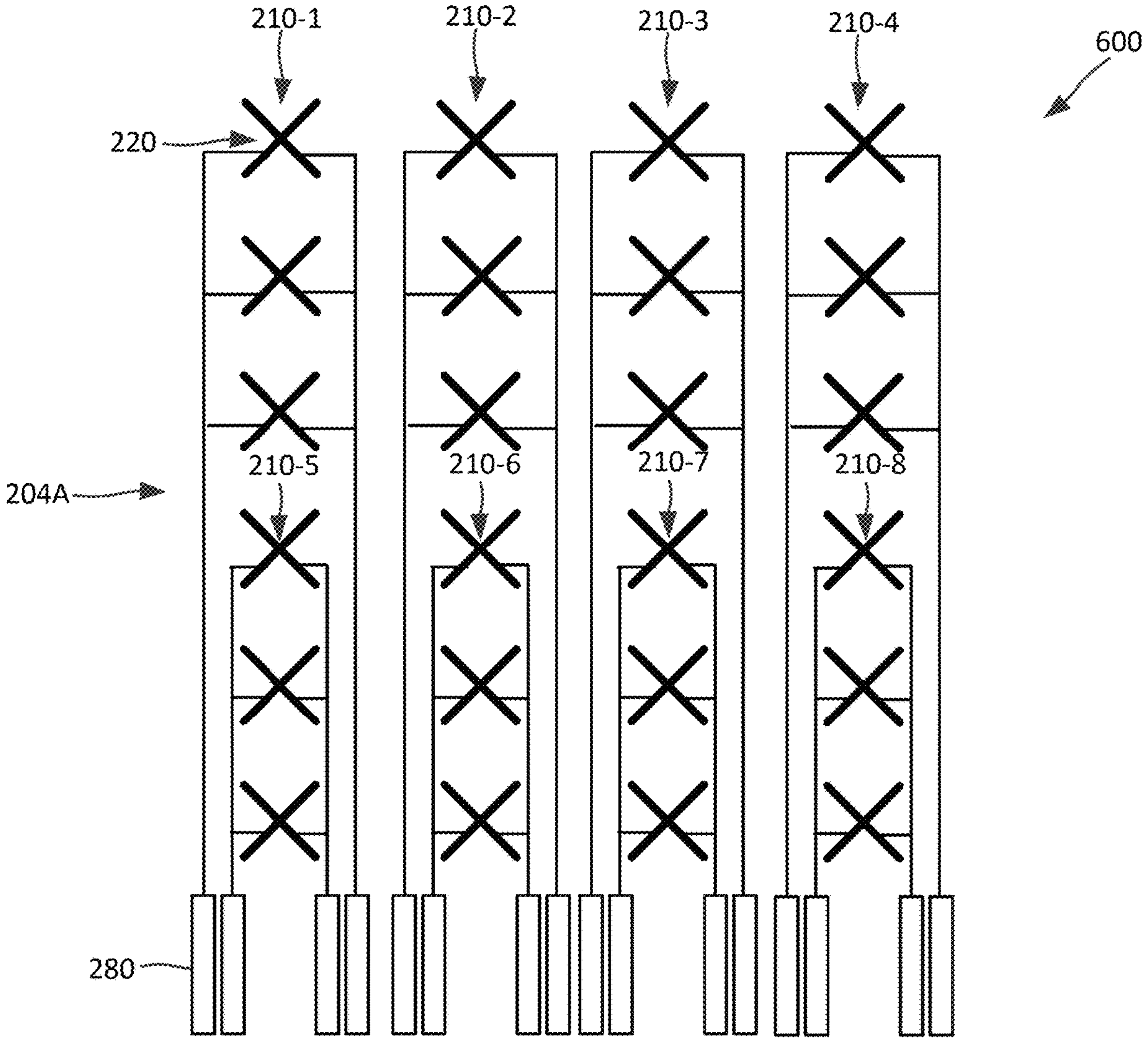
FIG. 9 is a schematic view of a portion of a base station antenna according to further embodiments of the present invention that includes an antenna array having two vertically stacked sets of columns of radiating elements.

FIG. 9 is a schematic view of a portion of a base station antenna 600 according to further embodiments of the present invention that includes an antenna array 204A having two vertically stacked sets of columns 210 of radiating elements 220. FIG. 9 only illustrates the phase shifters 280 and the antenna array 204A of base station antenna 600 in order to simplify the drawing.

As shown in FIG. 9, the antenna array 204A includes a total of eight columns 210 of radiating elements 220, where each column 210 includes three radiating elements 220 in this example embodiment. A first group of four columns 210-1 through 210-4 are aligned in a row and stacked above a second group of four columns 210-5 through 210-8 that are aligned in a second row. Two phase shifters 280 are coupled to each column 210, so base station antenna 600 includes sixteen phase shifters 280. Base station antenna 600 may be coupled, for example, to a sixteen port 16T/16R beamforming radio (with one radio port coupled to each phase shifter 280), whereas base station antennas 200, 300, 400, 500 would typically be coupled to an eight port 8T/8R radio. FIG. 9 shows that the multiple columns 210 of radiating elements 220 can be stacked vertically, where each column 210 corresponds to the radiating elements that are coupled to a pair of phase shifters 280 and radio ports.

Another aspect of the base station antennas according to embodiments of the present invention is that base station antennas are provided that include calibration circuits with "crossover" RF transmission lines. Referring again to FIG. 3A, the calibration circuit board 250 is typically mounted on the backplane 202 and is oriented so that the major surfaces of the calibration circuit board 250 extend parallel to the reflector 203 of the backplane 202. The radiating elements 220 of the antenna array 204 are mounted to extend forwardly from the reflector 203. The calibration circuit board 250 includes a calibration circuit 260 formed therein that includes a plurality of pairs 263 of directional couplers 262. A plurality of first polarization RF transmission lines and a plurality of second polarization RF transmission lines are also provided, where each first polarization RF transmission line connects a first of the directional couplers 262 of each pair 263 of directional couplers 262 to first polarization radiators 222 of the radiating elements 220 in the respective columns 210, and each second polarization RF transmission line connects a second of the directional couplers 262 of each pair 263 of directional couplers 262 to second polarization radiators 224 of the radiating elements 224 in the respective columns 210. As is further shown in FIG. 3A, each first polarization RF transmission line and each second RF transmission line may comprise a portion of one of the RF transmission lines 252 on the calibration circuit board 252 in combination with a respective one of the RF cables 270.

As shown in FIGS. 4-6, at least a first of the first polarization RF transmission lines crosses at least one of the second RF transmission lines. In the embodiments of FIGS. 4-6, these crossovers are formed in the cables 270, where various of the cables 270 cross various other of the cables 270. This is in contrast to the conventional base station antenna 200 of FIG. 3B, where none of the cables 270 cross any other of the cables 270. It will be appreciated that in other embodiments these crossovers may be implemented by crossing the RF transmission lines 252 as opposed to crossing the cables 270, or by crossing a combination of RF transmission lines 252 and cables 270.

The base station antennas according to embodiments of the present invention may exhibit improved in-column and/or adjacent cross-column isolation performance. Simulations indicate that a 1-3 dB improvement in in-band isolation may be achieved using, for example, the calibration circuit connection scheme of base station antenna 300. Similar improvements are expected with the base station antennas according to other embodiments of the present invention, and at least base station antennas 400 and 500 may also provide improved adjacent cross-column isolation performance.

In most of the example embodiments described above, the base station antenna includes four columns 210 of dual-polarized radiating elements 220, with a total of six radiating elements 220 in each column 210. It will be appreciated, however, that other numbers of columns 210 and/or radiating elements 220 may be included in base station antennas according to embodiments of the present invention. Thus, it will be appreciated that the embodiments described above are exemplary in nature and are not intended to be limiting as to the scope of the present invention. It will also be appreciated that other crossover connection schemes exist that may provide improved performance, and that the examples provided above are merely exemplary in nature.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

It will be understood that features illustrated with one example embodiment above can be incorporated into any of the other example embodiments. Thus, it will be appreciated that the disclosed embodiments may be combined in any way to provide many additional embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

That which is claimed is:

1. A base station antenna, comprising:

a calibration circuit having a plurality of pairs of directional couplers; and an antenna array that includes a plurality of columns of radiating elements, where first polarization radiators of the radiating elements in each column are electrically connected to a first directional coupler of a respective one of the pairs of directional couplers, and second polarization radiators of the radiating elements in the column are electrically connected to a second directional coupler of the respective one of the pairs of directional couplers, wherein a first directional coupler in a first of the pairs of directional couplers is only adjacent directional couplers in pairs of directional couplers other than the first of the pairs of directional couplers.

2. The base station antenna of claim 1, wherein the first directional coupler in the first of the pairs of directional couplers is interposed between the two directional couplers that form a second of the pairs of directional couplers.

3. The base station antenna of claim 2, wherein at least two directional couplers of pairs of directional couplers other than the second pair of directional couplers are interposed between the two directional couplers that form the second of the pairs of directional couplers.

4. The base station antenna of claim 1, wherein each directional coupler in each of the pairs of directional couplers is only adjacent directional couplers that are in other pairs of directional couplers.

5. The base station antenna of claim 1, wherein for each of the pairs of directional couplers, at least one of the directional couplers in another one of the pairs of directional couplers is interposed between the two directional couplers in the pair of directional couplers.

6. The base station antenna of claim 1, wherein for each of the pairs of directional couplers, at least two of the directional couplers from one or more of the other pairs of directional couplers are interposed between the two directional couplers in the pair of directional couplers.

7. The base station antenna of claim 1, wherein for each of the pairs of directional couplers, at least three of the directional couplers from one or more of the other pairs of directional couplers are interposed between the two directional couplers in the pair of directional couplers.

8. The base station antenna of claim 1, wherein the first directional coupler in the first of the pairs of directional couplers is electrically connected to a first of the columns of radiating elements and is only adjacent directional couplers that are in pairs of directional couplers that are electrically connected to columns of radiating elements that are not adjacent the first of the columns of radiating elements.

9. The base station antenna of claim 1, wherein the directional couplers in the pairs of directional couplers are positioned so that no set of two adjacent directional couplers are electrically connected to adjacent columns of radiating elements.

10. The base station antenna of claim 1, further comprising a plurality of first polarization RF ports and a plurality of second polarization RF ports, where each first polarization RF port is coupled to a first directional coupler in a respective one of the pairs of directional couplers, and each second polarization RF port is coupled to a second directional coupler in the respective one of the pairs of directional couplers.

11. A base station antenna, comprising:

a calibration circuit having a plurality of pairs of directional couplers; and an antenna array that includes a plurality of columns of radiating elements, where first polarization radiators of the radiating elements in each column are electrically connected to a first directional coupler of a respective one of the pairs of directional couplers, and second polarization radiators of the radiating elements in the column are electrically connected to a second directional coupler of the respective one of the pairs of directional couplers, wherein a first directional coupler in a first of the pairs of directional couplers is interposed between the two directional couplers that form a second of the pairs of directional couplers.

12. The base station antenna of claim 11, wherein at least two directional couplers of pairs of directional couplers other than the second pair of directional couplers are interposed between the two directional couplers that form the second of the pairs of directional couplers.

13. The base station antenna of claim 11, wherein for each of the pairs of directional couplers, at least one of the directional couplers in another one of the pairs of directional couplers is interposed between the two directional couplers in the pair of directional couplers.

14. The base station antenna of claim 11, wherein for each of the pairs of directional couplers, at least two of the directional couplers from one or more of the other pairs of directional couplers are interposed between the two directional couplers in the pair of directional couplers.

15. The base station antenna of claim 11, wherein the first directional coupler in the first of the pairs of directional couplers is electrically connected to a first of the columns of radiating elements and is only adjacent directional couplers that are in pairs of directional couplers that are electrically connected to columns of radiating elements that are not adjacent the first of the columns of radiating elements.

16. The base station antenna of claim 1, wherein the directional couplers in the pairs of directional couplers are positioned so that no set of two adjacent directional couplers are electrically connected to adjacent columns of radiating elements.

17. A base station antenna, comprising:

a calibration circuit having a plurality of directional couplers, the plurality of directional couplers including a plurality of first polarization directional couplers and a plurality of second polarization directional couplers; and an antenna array that includes a plurality of columns of radiating elements, where the radiating elements in each column are electrically connected to both a respective one of the first polarization directional couplers and a respective one of the second polarization directional couplers, wherein a first of the first polarization directional couplers that is electrically connected to a first of the columns of radiating elements is not adjacent a first of the second polarization directional couplers that is electrically connected to the first of the columns of radiating elements.

18. The base station antenna of claim 17, wherein each first polarization directional coupler that is electrically connected to each of the columns of radiating elements is not adjacent the respective second polarization directional coupler that is electrically connected to each of the columns of radiating elements.

19. The base station antenna of claim 17, wherein at least two of the directional couplers that are electrically connected to columns of radiating elements other than the first column of radiating elements are positioned between the first polarization directional coupler that is electrically connected to the first of the columns of radiating elements and the second polarization directional coupler that is electrically connected to the first of the columns of radiating elements.

20. The base station antenna of claim 17, wherein for each of the columns of radiating elements, at least two of the directional couplers that are electrically connected to other columns of radiating elements are positioned between the first polarization directional coupler for the column of radiating elements and the second polarization directional coupler for the column of radiating elements.

* * * * *